(12) United States Patent
Chen et al.

(10) Patent No.: US 12,385,819 B2
(45) Date of Patent: Aug. 12, 2025

(54) MEASURING QUALITY ATTRIBUTES OF A VIRUS SAMPLE

(71) Applicant: Wyatt Technology, LLC, Goleta, CA (US)

(72) Inventors: Michelle H. Chen, Goleta, CA (US); Sophia Kenrick, Goleta, CA (US)

(73) Assignee: Wyatt Technology, LLC, Goleta, CA (US)

( * ) Notice: Subject to any disclaimer, the term of this patent is extended or adjusted under 35 U.S.C. 154(b) by 314 days.

(21) Appl. No.: 17/939,950

(22) Filed: Sep. 7, 2022

(65) Prior Publication Data

US 2023/0112910 A1 Apr. 13, 2023

Related U.S. Application Data

(60) Provisional application No. 63/241,500, filed on Sep. 7, 2021.

(51) Int. Cl.
*G01N 15/0205* (2024.01)
*G01N 15/01* (2024.01)
(Continued)

(52) U.S. Cl.
CPC ..... *G01N 15/0211* (2013.01); *G01N 21/4133* (2013.01); *G01N 30/74* (2013.01); *G01N 15/01* (2024.01); *G01N 2015/0222* (2013.01)

(58) Field of Classification Search
CPC ........... G01N 15/0211; G01N 21/4133; G01N 30/74; G01N 15/01; G01N 2015/0222;
(Continued)

(56) References Cited

U.S. PATENT DOCUMENTS

2021/0231560 A1 7/2021 Wu et al.
2022/0308022 A1* 9/2022 Bhat .................. C12N 15/86

FOREIGN PATENT DOCUMENTS

WO 2021062164 A1 4/2021

OTHER PUBLICATIONS

International Search Report and Written Opinion in PCT/US2023/028754 mailed on Nov. 6, 2023.
(Continued)

*Primary Examiner* — Thanh Luu
*Assistant Examiner* — Mai Thi Ngoc Tran
(74) *Attorney, Agent, or Firm* — Schmeiser, Olsen & Watts LLP (57) ABSTRACT

The present disclosure describes a computer implemented method, a system, and a computer program product of measuring quality attributes of a virus sample. In an embodiment, the method, system, and computer program product include (1) receiving light scattering (LS) data from a light scattering detector analyzing separations of a virus sample, dRI data, and UV data, (2) receiving a molecular weight of a protein component of the sample, Mprotein (expected), a refractive index increment of the protein component, (dn/dc)protein, a refractive index increment of a DNA component of the sample, (dn/dc)DNA, and an extinction coefficient of the protein component, εprotein, (3) calculating a protein fraction of the sample, xprotein, with respect to the LS data, the dRI data, the Mprotein (expected), the (dn/dc) protein, the (dn/dc)DNA, and an optical constant, K, (4) calculating a DNA extinction coefficient of the sample, εDNA, and (5) calculating quality attribute values of the sample.

19 Claims, 7 Drawing Sheets

(51) Int. Cl.
*G01N 21/41* (2006.01)
*G01N 30/74* (2006.01)

(58) Field of Classification Search
CPC ........ G01N 21/51; G01N 30/88; G01N 30/86; G01N 2030/8831
See application file for complete search history.

(56) References Cited

OTHER PUBLICATIONS

Porterfield, et al. "A simple and general method for determining the protein and nucleic acid content of viruses by UV absorbance," Virology, vol. 407, No. 2, Nov. 25, 2010, pp. 281-288.

Sommer, et al. "Quantification of adeno-associated virus particles and empty capsids by optical density measurement," Molecular Therapy, vol. 7, No. 1, Jan. 1, 2003, pp. 122-128.

Coll De Pena, et al. "Electrophoresis-Mediated Characterization of Full and Empty Adeno-Assocaited Virus Capsids" ACS Omega, vol. 7, No. 27, Jun. 29, 2022.

Yamazaki, et al. "Isolation and characterization of a protein sunbunit of broad bean mottle virus" Journal of Molecular Biology, vol. 6, No. 6, Jun. 1, 1963, pp. 465-473.

Englander, et al. "Optical methods for measuring nucleoprotein and nucleic acid concentrations," Archives of Biochemistry and Biophysics, vol. 68, No. 1, May 1, 1957, pp. 144-149.

Peljhan, et al. "Multiple-parameter profiling of density gradient ultracentrifugation for characterization of empty and full capsid distribution in AAV preparations," Cell and Gene Therapy Inights, vol. 7, No. 2, Mar. 16, 2021, pp. 161-169.

International Preliminary Report on Patentability in PCT/US2023/028754 mailed on Mar. 20, 2025.

\* cited by examiner

MEASURING QUALITY ATTRIBUTES OF A VIRUS SAMPLE

PRIORITY

This application claims priority to U.S. Provisional Patent Application No. 63/241,500, filed Sep. 7, 2021.

BACKGROUND

The present disclosure relates to samples, and more specifically, to measuring quality attributes of a virus sample.

SUMMARY

The present disclosure describes a computer implemented method, a system, and a computer program product of measuring quality attributes of a virus sample. In an exemplary embodiment, the computer implemented method, the system, and the computer program product include (1) receiving, by a computer system, light scattering data from a light scattering detector analyzing separations of a virus sample, differential refractive index (dRI) data from a differential refractometer analyzing the separations, and ultraviolet (UV) absorbance data, A, from a UV detector at at least one wavelength analyzing the separations, (2) receiving, by the computer system, a molecular weight of a protein component of the sample, $M_{protein\ (expected)}$, a refractive index increment of the protein component, $(dn/dc)_{protein}$, a refractive index increment of a DNA component of the sample, $(dn/dc)DNA$, and an extinction coefficient of the protein component, $\varepsilon_{protein}$, at the at least one wavelength from a data source, (3) calculating, by the computer system, a protein fraction of the sample, $x_{protein}$, with respect to the light scattering data, the differential refractive index data, the molecular weight of the protein component, $M_{protein\ (expected)}$, the refractive index increment of the protein component, $(dn/dc)_{protein}$, the refractive index increment of the DNA component, $(dn/dc)_{DNA}$, and an optical constant, K, (4) calculating, by the computer system, a DNA extinction coefficient of the sample, $\varepsilon_{DNA}$, at the at least one wavelength with respect to the calculated protein fraction, $x_{protein}$, the differential refractive index data, the ultraviolet absorbance data, A, the refractive index increment of the protein component, $(dn/dc)protein$, the refractive index increment of the DNA component, $(dn/dc)_{DNA}$, the extinction coefficient of the protein component, $\varepsilon_{protein}$, at the at least one wavelength, and a path length, L, of a cell in the UV detector, and (5) calculating, by the computer system, quality attribute values of the sample with respect to the calculated DNA extinction coefficient, $\varepsilon_{DNA}$.

DETAILED DESCRIPTION

The present disclosure describes a computer implemented method, a system, and a computer program product of measuring quality attributes of a virus sample. In an exemplary embodiment, the computer implemented method, the system, and the computer program product include (1) receiving, by a computer system, light scattering data from a light scattering detector analyzing separations of a virus sample, differential refractive index (dRI) data from a differential refractometer analyzing the separations, and ultraviolet (UV) absorbance data, A, from a UV detector at at least one wavelength analyzing the separations, (2) receiving, by the computer system, a molecular weight of a protein component of the sample, $M_{protein\ (expected)}$, a refractive index increment of the protein component, $(dn/dc)_{protein}$, a refractive index increment of a DNA component of the sample, $(dn/dc)_{DNA}$, and an extinction coefficient of the protein component, $\varepsilon_{protein}$, at the at least one wavelength from a data source, (3) calculating, by the computer system, a protein fraction of the sample, $x_{protein}$, with respect to the light scattering data, the differential refractive index data, the molecular weight of the protein component, $M_{protein}$ (expected), the refractive index increment of the protein component, $(dn/dc)_{protein}$, the refractive index increment of the DNA component, $(dn/dc)_{DNA}$, and an optical constant, K, (4) calculating, by the computer system, a DNA extinction coefficient of the sample, $\varepsilon_{DNA}$, at the at least one wavelength with respect to the calculated protein fraction, $x_{protein}$, the differential refractive index data, the ultraviolet absorbance data, A, the refractive index increment of the protein component, $(dn/dc)_{protein}$, the refractive index increment of the DNA component, $(dn/dc)_{DNA}$, the extinction coefficient of the protein component, $\varepsilon_{protein}$, at the at least one wavelength, and a path length, L, of a cell in the UV detector, and (5) calculating, by the computer system, quality attribute values of the sample with respect to the calculated DNA extinction coefficient, $\varepsilon_{DNA}$. In an embodiment, the light scattering data includes static light scattering (SLS) data. For example, the light scattering data is static light scattering (SLS) data. In an embodiment, the light scattering data further includes dynamic light scattering (DLS) data. For example, the light scattering data further is dynamic light scattering (DLS) data.

In an embodiment, the virus sample includes a virus with a radius of less than 30 nm. For example, the virus is small-sized and non-enveloped). For example, the virus has a radius of 14 nm. In particular embodiment, the virus sample includes adeno-associated virus (AAV). For example, the virus sample is adeno-associated virus (AAV). In an embodiment, the at least one wavelength is 260 nm. In an embodiment, the at least one wavelength is 280 nm. In an embodiment, the protein component includes a protein capsid. For example, the protein component is a protein capsid. In an embodiment, the data source includes at least one of user input and a database.

In an exemplary embodiment, the computer implemented method, the system, and the computer program product include (1) receiving, by a computer system, light scattering data from a light scattering detector analyzing separations of a virus sample, differential refractive index data from a differential refractometer analyzing the separations, and ultraviolet (UV) absorbance data, A, from a UV detector at at least one wavelength analyzing the separations, (2) receiving, by the computer system, a molecular weight of a protein component of the sample, $M_{protein\ (expected)}$, a refractive index increment of the protein component, $(dn/dc)_{protein}$, a refractive index increment of a DNA component of the sample, $(dn/dc)_{DNA}$, an extinction coefficient of the protein component, $\varepsilon_{protein}$, at the at least one wavelength, and a protein fraction of the sample, $x_{protein}$, from a data source, (3) calculating, by the computer system, a DNA extinction coefficient of the sample, $\varepsilon_{DNA}$, at the at least one wavelength with respect to the protein fraction, $x_{protein}$, the differential refractive index data, the ultraviolet absorbance data, A, the refractive index increment of the protein component, $(dn/dc)_{protein}$, the refractive index increment of the DNA component, $(dn/dc)_{DNA}$, the extinction coefficient of the protein component, $\varepsilon_{protein}$, at the at least one wavelength, and a path length, L, of a cell in the UV detector, and (4) calculating, by the computer system, quality attribute values of the sample with respect to the calculated DNA extinction coefficient, $\varepsilon_{DNA}$. In an further embodiment, the method, the system, and the computer program product further include calculating, by the computer system, the protein fraction of the sample, $x_{protein}$, with respect to the light scattering data, the differential refractive index data, the molecular weight of the protein component, $M_{protein\ (expected)}$, the refractive index increment of the protein component, $(dn/dc)_{protein}$, the refractive index increment of the DNA component, $(dn/dc)_{DNA}$, and an optical constant, K.

In an embodiment, the computer implemented method, the system, and the computer program product allow for accurate calculation of DNA extinction coefficients at 260 and 280 nm, which in turn allow accurate AAV quality attribute measurements.

Definitions

Particle

A particle may be a constituent of a liquid sample aliquot. Such particles may be molecules of varying types and sizes, nanoparticles, virus like particles, liposomes, emulsions, bacteria, and colloids. These particles may range in size on the order of nanometer to microns.

Analysis of Macromolecular or Particle Species in Solution

The analysis of macromolecular or particle species in solution may be achieved by preparing a sample in an appropriate solvent and then injecting an aliquot thereof into a separation system such as a liquid chromatography (LC) column or field flow fractionation (FFF) channel where the different species of particles contained within the sample are separated into their various constituencies. Once separated, generally based on size, mass, or column affinity, the samples may be subjected to analysis by means of light scattering, refractive index, ultraviolet absorption, electrophoretic mobility, and viscometric response.

Light Scattering

Light scattering (LS) is a non-invasive technique for characterizing macromolecules and a wide range of particles in solution. The two types of light scattering detection frequently used for the characterization of macromolecules are static light scattering and dynamic light scattering.

Dynamic Light Scattering

Dynamic light scattering is also known as quasi-elastic light scattering (QELS) and photon correlation spectroscopy (PCS). In a DLS experiment, time-dependent fluctuations in the scattered light signal are measured using a fast photodetector. DLS measurements determine the diffusion coefficient of the molecules or particles, which can in turn be used to calculate their hydrodynamic radius.

Static Light Scattering

Static light scattering (SLS) includes a variety of techniques, such as single angle light scattering (SALS), dual angle light scattering (DALS), low angle light scattering (LALS), and multi-angle light scattering (MALS). SLS experiments generally involve the measurement of the absolute intensity of the light scattered from a sample in solution that is illuminated by a fine beam of light. Such measurement is often used, for appropriate classes of particles/molecules, to determine the size and structure of the sample molecules or particles, and, when combined with knowledge of the sample concentration, the determination of weight average molar mass. In addition, nonlinearity of the intensity of scattered light as a function of sample concentration may be used to measure interparticle interactions and associations.

Multi-Angle Light Scattering

Multi-angle light scattering (MALS) is a SLS technique for measuring the light scattered by a sample into a plurality of angles. It is used for determining both the absolute molar mass and the average size of molecules in solution, by detecting how they scatter light. Collimated light from a laser source is most often used, in which case the technique can be referred to as multiangle laser light scattering (MALLS). The "multi-angle" term refers to the detection of scattered light at different discrete angles as measured, for example, by a single detector moved over a range that includes the particular angles selected or an array of detectors fixed at specific angular locations.

A MALS measurement requires a set of ancillary elements. Most important among them is a collimated or focused light beam (usually from a laser source producing a collimated beam of monochromatic light) that illuminates a region of the sample. The beam is generally plane-polarized perpendicular to the plane of measurement, though other polarizations may be used especially when studying anisotropic particles. Another required element is an optical cell to hold the sample being measured. Alternatively, cells incorporating means to permit measurement of flowing samples may be employed. If single-particles scattering properties are to be measured, a means to introduce such particles one-at-a-time through the light beam at a point generally equidistant from the surrounding detectors must be provided.

Although most MALS-based measurements are performed in a plane containing a set of detectors usually equidistantly placed from a centrally located sample through which the illuminating beam passes, three-dimensional versions also have been developed where the detectors lie on the surface of a sphere with the sample controlled to pass through its center where it intersects the path of the incident light beam passing along a diameter of the sphere. The MALS technique generally collects multiplexed data sequentially from the outputs of a set of discrete detectors. The MALS light scattering photometer generally has a plurality of detectors.

Normalizing the signals captured by the photodetectors of a MALS detector at each angle may be necessary because different detectors in the MALS detector (i) may have slightly different quantum efficiencies and different gains, and (ii) may look at different geometrical scattering volumes. Without normalizing for these differences, the MALS detector results could be nonsensical and improperly weighted toward different detector angles.

Concentration Detector

Differential Refractive Index Detector

A differential refractive index detector (dRI), or differential refractometer, or refractive index detector (RI or RID), is a detector that measures the refractive index of an analyte relative to the solvent. They are often used as detectors for high-performance liquid chromatography and size exclusion chromatography. dRIs are considered to be universal detectors because they can detect anything with a refractive index different from the solvent, but they have low sensitivity. When light leaves one material and enters another it bends, or refracts. The refractive index of a material is a measure of how much light bends when it enters.

A differential refractive index detector contain a flow cell with the following two parts: one for the sample; and one for the reference solvent. The dRI measures the refractive index of both components. When only solvent is passing through the sample component, the measured refractive index of both components is the same, but when an analyte passes through the flow cell, the two measured refractive indices are different. The difference appears as a peak in the chromatogram. Differential refractive index detectors are often used for the analysis of polymer samples in size exclusion chromatography. A dRI could output a concentration detector signal value corresponding to a concentration value of a sample.

Ultraviolet-Visible Spectroscopy

Ultraviolet-visible spectroscopy or ultraviolet-visible spectrophotometry (UV-Vis or UV/Vis) refers to absorption spectroscopy or reflectance spectroscopy in the ultraviolet-visible spectral region. An ultraviolet-visible detector/ultraviolet-visible spectrophotometer uses light in the visible and adjacent ranges, where the absorption or reflectance in the visible range directly affects the perceived color of the chemicals involved, where in this region of the electromagnetic spectrum, atoms and molecules undergo electronic transitions. Such absorption spectroscopy measures transitions from the ground state to the excited state. An ultraviolet-visible detector/ultraviolet-visible spectrophotometer measures the intensity of light passing through a sample (I), and compares it to the intensity of light before it passes through the sample ($I_o$), where the ratio $I/I_o$ is called the transmittance, and is usually expressed as a percentage (% T). The absorbance, A, is based on the transmittance according to $$A=-\log(\% T/100\%).$$

The UV-visible spectrophotometer can also be configured to measure reflectance, where the spectrophotometer measures the intensity of light reflected from a sample (I), and compares it to the intensity of light reflected from a reference material ($I_o$), where the ratio $I/I_o$ is called the reflectance, and is usually expressed as a percentage (% R). An ultraviolet absorption detector could output a concentration detector signal value corresponding to a concentration value of a sample.

Current Technologies

Current technologies use for measuring AAV quality attributes require the following sample constants: the respective dn/dc values and extinction coefficients of AAV protein capsid and encapsulated DNA. While the dn/dc values are well known, the extinction coefficients of protein capsid at 260 and 280 nm can be estimated from the amino acid sequences of the capsid proteins and can also be experimentally determined using via software. The encapsulated DNA extinction coefficients, however, are not well known. Current technologies back-calculate these values assuming the "full" AAV sample is 100% full. However, in the real-world, 100% full AAV samples are often not available, and the encapsulated DNA extinction coefficients may vary with the DNA length. Thus, there is a need to measure quality attributes of a virus sample more accurately.

Figure 1A:
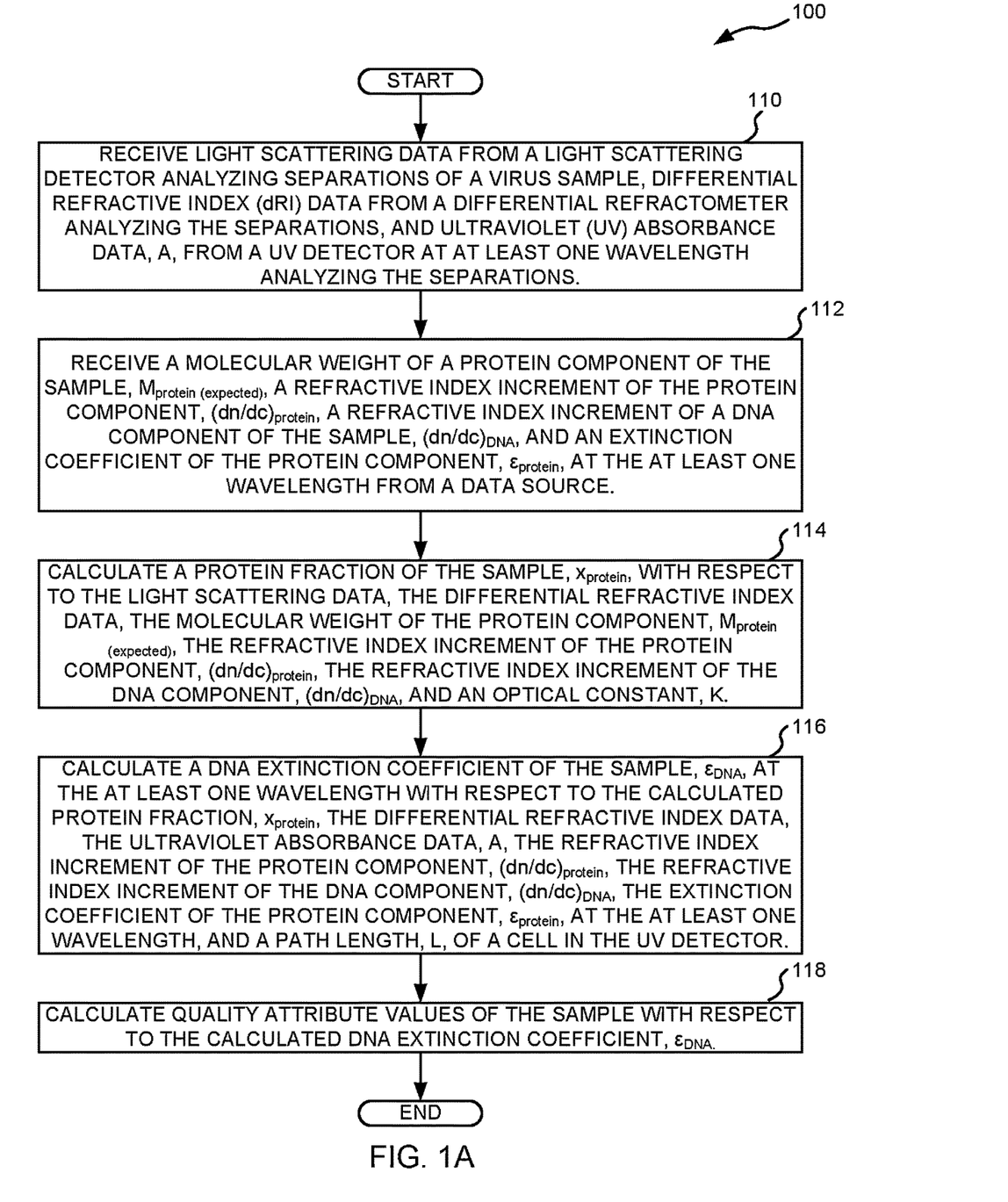
FIG. 1A depicts a flowchart in accordance with an exemplary embodiment.

Referring to FIG. 1A, in an exemplary embodiment, the computer implemented method, the system, and the computer program product are configured to perform an operation 110 of receiving, by a computer system, light scattering (LS) data from a light scattering detector analyzing separations of a virus sample, differential refractive index (dRI) data from a differential refractometer analyzing the separations, and ultraviolet (UV) absorbance data, A, from a UV detector at at least one wavelength analyzing the separations, an operation 112 of receiving, by the computer system, a molecular weight of a protein component of the sample, $M_{protein\ (expected)}$, a refractive index increment of the protein component, $(dn/dc)_{protein}$, a refractive index increment of a DNA component of the sample, $(dn/dc)_{DNA}$, and an extinction coefficient of the protein component, $\varepsilon_{protein}$, at the at least one wavelength from a data source, an operation 114 of calculating, by the computer system, a protein fraction of the sample, $x_{protein}$, with respect to the light scattering data, the differential refractive index data, the molecular weight of the protein component, $M_{protein\ (expected)}$, the refractive index increment of the protein component, $(dn/dc)_{protein}$, the refractive index increment of the DNA component, $(dn/dc)_{DNA}$, and an optical constant, K, an operation 116 of calculating, by the computer system, a DNA extinction coefficient of the sample, $\varepsilon_{DNA}$, at the at least one wavelength with respect to the calculated protein fraction, $x_{protein}$, the differential refractive index data, the ultraviolet absorbance data, A, the refractive index increment of the protein component, $(dn/dc)_{protein}$, the refractive index increment of the DNA component, $(dn/dc)_{DNA}$, the extinction coefficient of the protein component, $\varepsilon_{protein}$, at the at least one wavelength, and a path length, L, of a cell in the UV detector, and an operation 118 of calculating, by the computer system, quality attribute values of the sample with respect to the calculated DNA extinction coefficient, $\varepsilon_{DNA}$.

Figure 5:
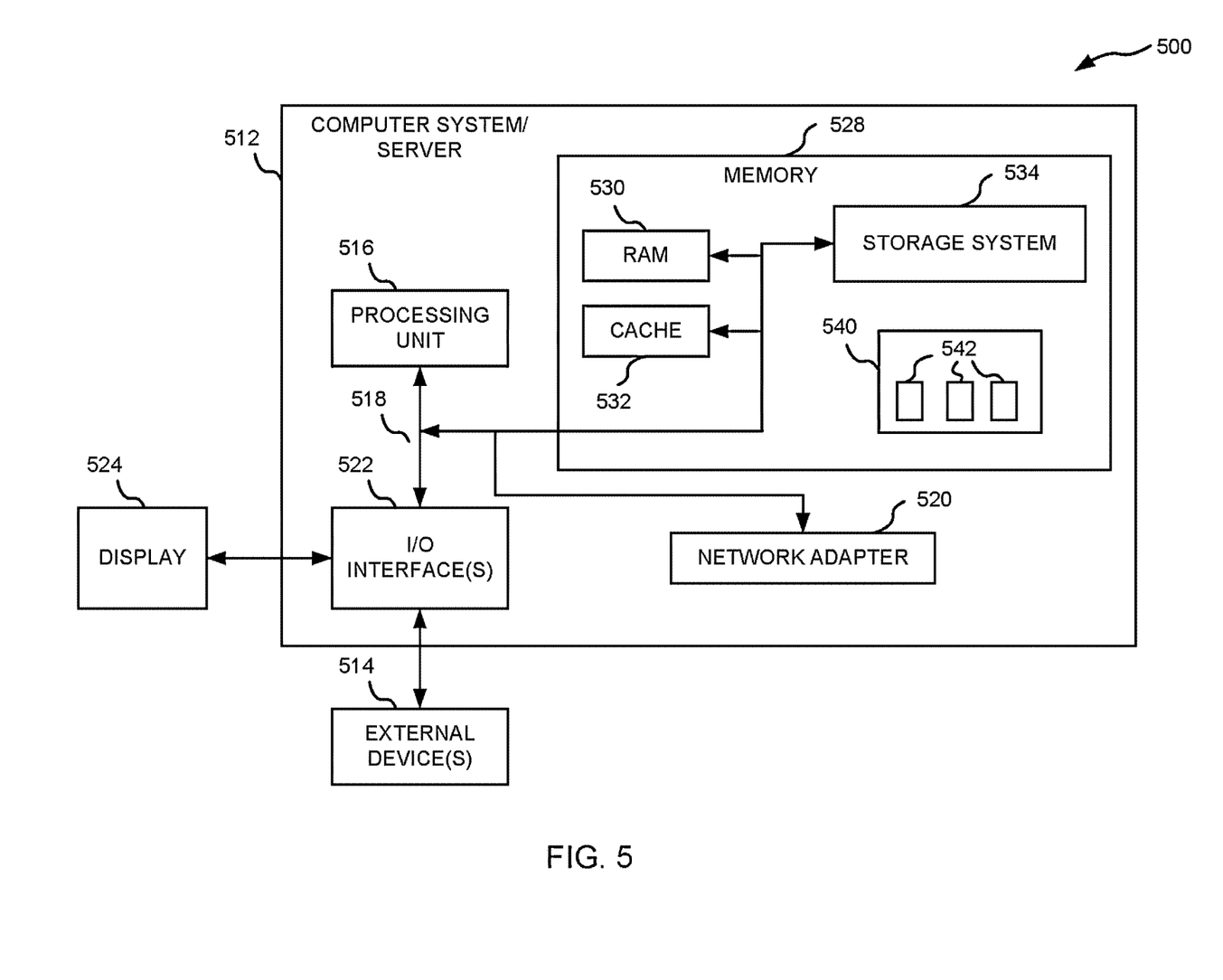
FIG. 5 depicts a computer system in accordance with an exemplary embodiment.

In an exemplary embodiment, the computer system is a standalone computer system, such as computer system 500 shown in FIG. 5, a network of distributed computers, where at least some of the computers are computer systems such as computer system 500 shown in FIG. 5, or a cloud computing node server, such as computer system 500 shown in FIG. 5. In an embodiment, the computer system is a computer system 500 as shown in FIG. 5, that executes a measuring quality attributes of a virus sample script or computer software application that carries out the operations of at least method 100. In an embodiment, the computer system is a computer system/server 512 as shown in FIG. 5, that executes a measuring quality attributes of a virus sample script or computer software application that carries out the operations of at least method 100. In an embodiment, the computer system is a processing unit 516 as shown in FIG. 5, that executes a measuring quality attributes of a virus sample script or computer software application that carries out the operations of at least method 100. In an embodiment, the computer system is a machine learning computer software/program/algorithm that executes a measuring quality attributes of a virus sample script or computer software application that carries out the operations of at least method 100.

In an embodiment, the computer system is a computer system 500 as shown in FIG. 5, that executes a measuring quality attributes of a virus sample script or computer software application that carries out at least operations 110, 112, 114, 116, and 118. In an embodiment, the computer system is a computer system/server 512 as shown in FIG. 5, that executes a measuring quality attributes of a virus sample script or computer software application that carries out at least operations 110, 112, 114, 116, and 118. In an embodiment, the computer system is a processing unit 516 as shown in FIG. 5, that executes a measuring quality attributes of a virus sample script or computer software application that carries out at least operations 110, 112, 114, 116, and 118.

Figure 1B:
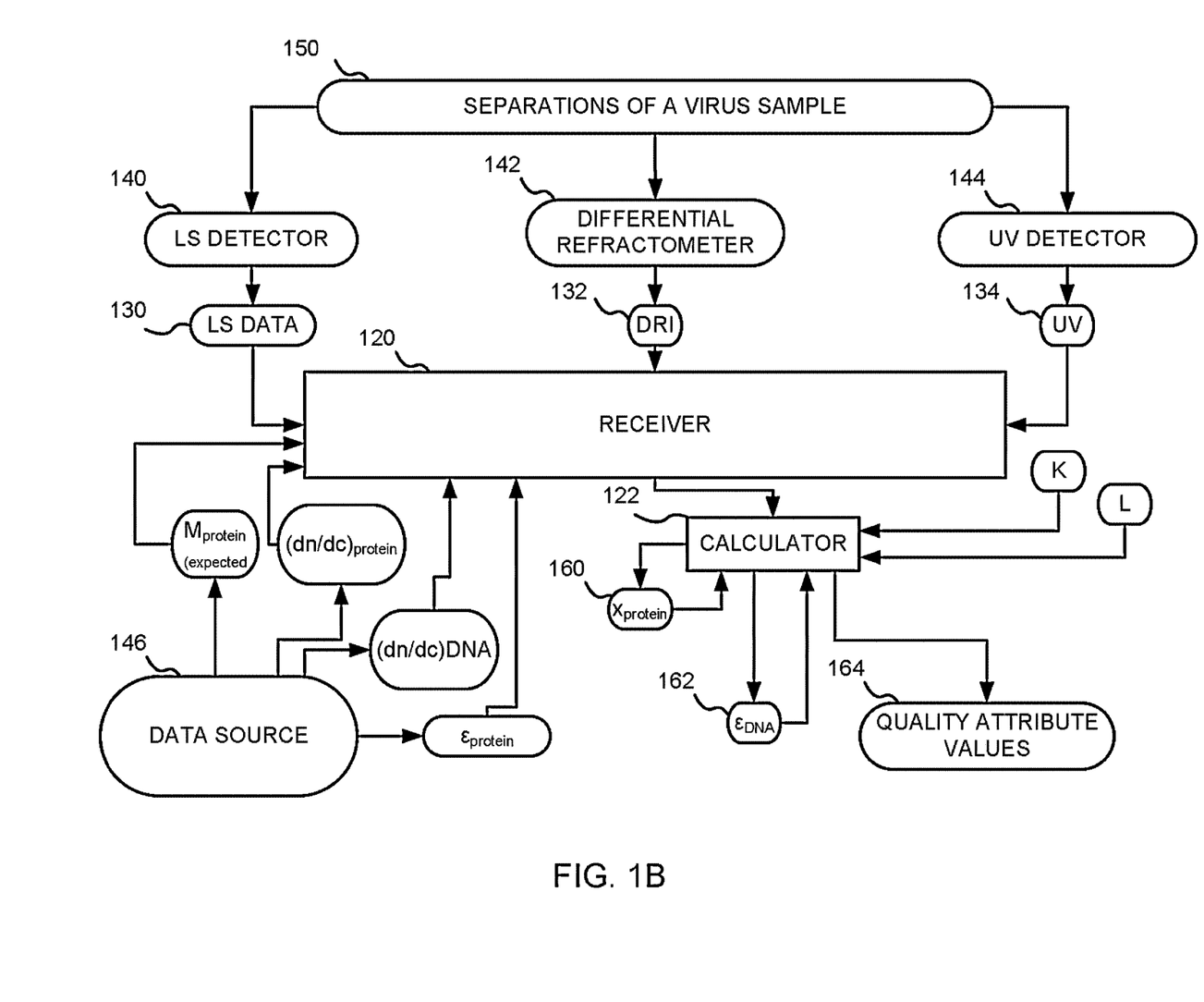
FIG. 1B depicts a block diagram in accordance with an exemplary embodiment.

Referring to FIG. 1B, in an exemplary embodiment, the computer implemented method, the system, and the computer program product include a receiver 120, and a calculator 122. In an embodiment, receiver 120 is configured to receive light scattering (LS) data 130 from a light scattering detector 140 analyzing separations of a virus sample 150, differential refractive index (dRI) data 132 from a differential refractometer 142 analyzing separations 150, and ultraviolet (UV) absorbance data, A, 134 from a UV detector 144 at at least one wavelength analyzing separations 150. In an embodiment, receiver 120 includes a computer system, such as computer system 500 as shown in FIG. 5, performing operation 110. In an embodiment, receiver 120 includes a computer system, such as computer system/server 512 as shown in FIG. 5, performing operation 110. In an embodiment, receiver 120 includes a computer system, such as processing unit 516 as shown in FIG. 5, performing operation 110. In an embodiment, receiver 120 is implemented as computer software executing on a computer system, such as computer system 500 as shown in FIG. 5, such that the computer system performs operation 110. In an embodiment, receiver 120 is implemented as computer software executing on a computer system, such as computer system/server 512 as shown in FIG. 5, such that the computer system performs operation 110. In an embodiment, receiver 120 is implemented as computer software executing on a computer system, such as processing unit 516 as shown in FIG. 5, such that the computer system performs operation 110. In an embodiment, receiver 120 performs operation 110 as computer software executing on a processor of receiver 120.

In an embodiment, receiver 120 is configured to receive a molecular weight of a protein component of the sample, $M_{protein\ (expected)}$, a refractive index increment of the protein component, $(dn/dc)_{protein}$, a refractive index increment of a DNA component of the sample, $(dn/dc)_{DNA}$, and an extinction coefficient of the protein component, $\varepsilon_{protein}$, at the at least one wavelength from a data source 146. In an embodiment, receiver 122 includes a computer system, such as computer system 500 as shown in FIG. 5, performing operation 112. In an embodiment, receiver 120 includes a computer system, such as computer system/server 512 as shown in FIG. 5, performing operation 112. In an embodiment, receiver 120 includes a computer system, such as processing unit 516 as shown in FIG. 5, performing operation 112. In an embodiment, receiver 120 is implemented as computer software executing on a computer system, such as computer system 500 as shown in FIG. 5, such that the computer system performs operation 112. In an embodiment, receiver 120 is implemented as computer software executing on a computer system, such as computer system/server 512 as shown in FIG. 5, such that the computer system performs operation 112. In an embodiment, receiver 120 is implemented as computer software executing on a computer system, such as processing unit 516 as shown in FIG. 5, such that the computer system performs operation 112. In an embodiment, receiver 120 performs operation 112 as computer software executing on a processor of receiver 120.

In an embodiment, calculator 122 is configured to calculate a protein fraction of the sample, $x_{protein}$, 160 with respect to light scattering (LS) data 130, differential refractive index (dRI) data 132, the molecular weight of the protein component, $M_{protein\ (expected)}$, the refractive index increment of the protein component, $(dn/dc)_{protein}$, the refractive index increment of the DNA component, $(dn/dc)_{DNA}$, and an optical constant, K. In an embodiment, calculator 122 includes a computer system, such as computer system 800 as shown in FIG. 8, performing operation 114. In an embodiment, calculator 122 includes a computer system, such as computer system/server 812 as shown in FIG. 8, performing operation 114. In an embodiment, calculator 122 includes a computer system, such as processing unit 816 as shown in FIG. 8, performing operation 114. In an embodiment, calculator 122 is implemented as computer software executing on a computer system, such as computer system 800 as shown in FIG. 8, such that the computer system performs operation 114. In an embodiment, calculator 122 is implemented as computer software executing on a computer system, such as computer system/server 812 as shown in FIG. 8, such that the computer system performs operation 114. In an embodiment, calculator 122 is implemented as computer software executing on a computer system, such as processing unit 816 as shown in FIG. 8, such that the computer system performs operation 114. In an embodiment, calculator 122 performs operation 114 as computer software executing on a processor of calculator 122.

In an embodiment, calculator 122 is configured to calculate a DNA extinction coefficient of the sample, $\varepsilon_{DNA}$, 162 at the at least one wavelength with respect to the calculated protein fraction, $x_{protein}$, 160, differential refractive index (dRI) data 132, ultraviolet (UV) absorbance data, A, 134, the refractive index increment of the protein component, $(dn/dc)_{protein}$, the refractive index increment of the DNA component, $(dn/dc)_{DNA}$, the extinction coefficient of the protein component, $\varepsilon_{protein}$, at the at least one wavelength, and a path length, L, of a cell in the UV detector. In an embodiment, calculator 122 includes a computer system, such as computer system 800 as shown in FIG. 8, performing operation 116. In an embodiment, calculator 122 includes a computer system, such as computer system/server 812 as shown in FIG. 8, performing operation 116. In an embodiment, calculator 122 includes a computer system, such as processing unit 816 as shown in FIG. 8, performing operation 116. In an embodiment, calculator 122 is implemented as computer software executing on a computer system, such as computer system 800 as shown in FIG. 8, such that the computer system performs operation 116. In an embodiment, calculator 122 is implemented as computer software executing on a computer system, such as computer system/server 812 as shown in FIG. 8, such that the computer system performs operation 116. In an embodiment, calculator 122 is implemented as computer software executing on a computer system, such as processing unit 816 as shown in FIG. 8, such that the computer system performs operation 116. In an embodiment, calculator 122 performs operation 116 as computer software executing on a processor of calculator 122.

In an embodiment, calculator 122 is configured to calculate quality attribute values 164 of the sample with respect to the calculated DNA extinction coefficient, $\varepsilon_{DNA}$, 162. In an embodiment, calculator 122 includes a computer system, such as computer system 800 as shown in FIG. 8, performing operation 118. In an embodiment, calculator 122 includes a computer system, such as computer system/server 812 as shown in FIG. 8, performing operation 118. In an embodiment, calculator 122 includes a computer system, such as processing unit 816 as shown in FIG. 8, performing operation 118. In an embodiment, calculator 122 is implemented as computer software executing on a computer system, such as computer system 800 as shown in FIG. 8, such that the computer system performs operation 118. In an embodiment, calculator 122 is implemented as computer software executing on a computer system, such as computer system/server 812 as shown in FIG. 8, such that the computer system performs operation 118. In an embodiment, calculator 122 is implemented as computer software executing on a computer system, such as processing unit 816 as shown in FIG. 8, such that the computer system performs operation 118. In an embodiment, calculator 122 performs operation 118 as computer software executing on a processor of calculator 122.

Figure 2:
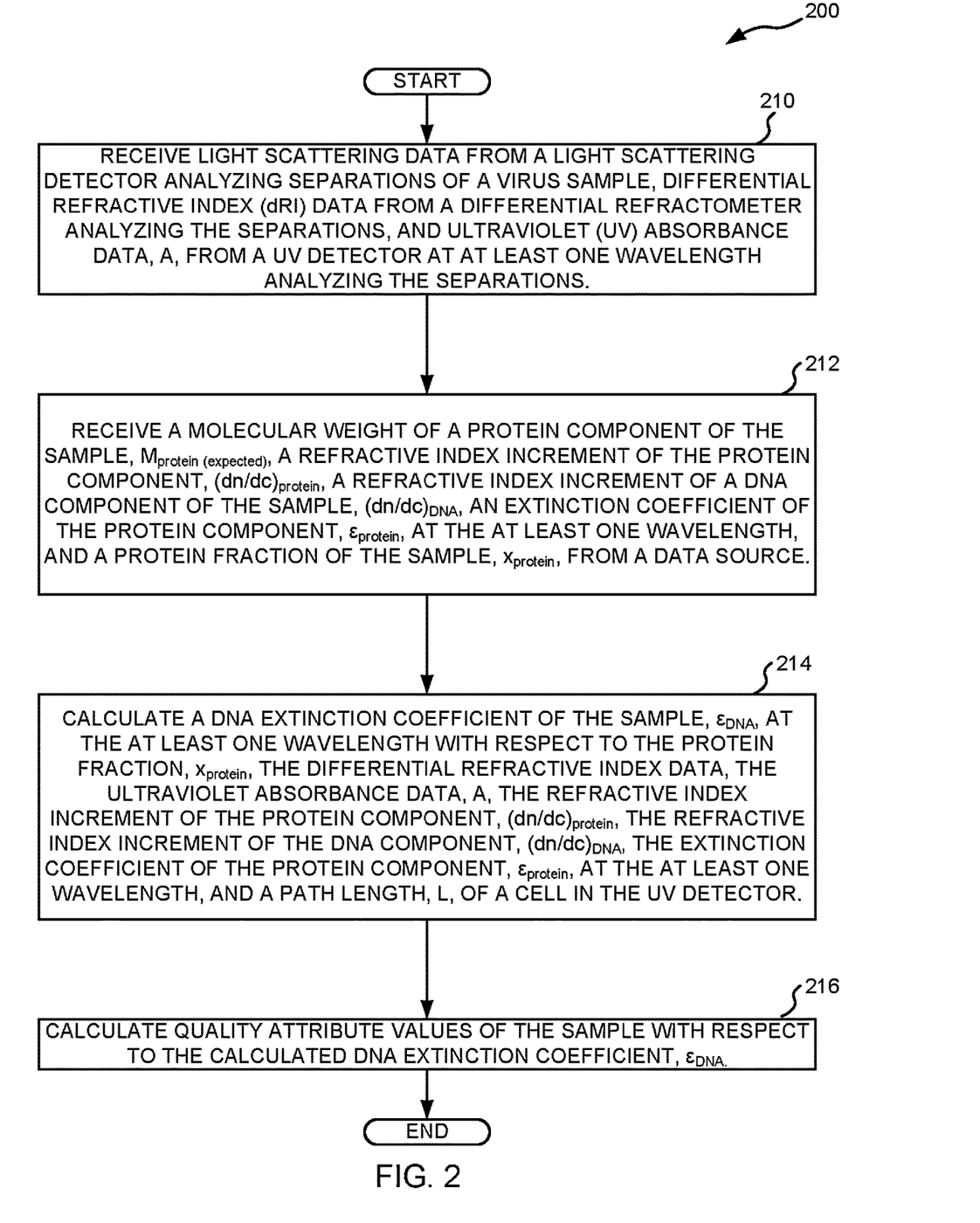
FIG. 2 depicts a flowchart in accordance with an embodiment.

Referring to FIG. 2, in an exemplary embodiment, the computer implemented method, the system, and the computer program product are configured to perform an operation 210 of receiving, by a computer system, light scattering data from a light scattering detector analyzing separations of a virus sample, differential refractive index data from a differential refractometer analyzing the separations, and ultraviolet (UV) absorbance data, A, from a UV detector at at least one wavelength analyzing the separations, an operation 212 of receiving, by the computer system, a molecular weight of a protein component of the sample, $M_{protein\ (expected)}$, a refractive index increment of the protein component, $(dn/dc)_{protein}$, a refractive index increment of a DNA component of the sample, $(dn/dc)_{DNA}$, an extinction coefficient of the protein component, $\varepsilon_{protein}$, at the at least one wavelength, and a protein fraction of the sample, $x_{protein}$, from a data source, an operation 214 of calculating, by the computer system, a DNA extinction coefficient of the sample, $\varepsilon_{DNA}$, at the at least one wavelength with respect to the protein fraction, $x_{protein}$, the differential refractive index data, the ultraviolet absorbance data, A, the refractive index increment of the protein component, $(dn/dc)_{protein}$, the refractive index increment of the DNA component, $(dn/dc)_{DNA}$, the extinction coefficient of the protein component, $\varepsilon_{protein}$, at the at least one wavelength, and a path length, L, of a cell in the UV detector, and an operation 216 of calculating, by the computer system, quality attribute values of the sample with respect to the calculated DNA extinction coefficient, $\varepsilon_{DNA}$.

In an embodiment, the computer system is a computer system 500 as shown in FIG. 5, that executes a measuring quality attributes of a virus sample script or computer software application that carries out the operations of at least method 200. In an embodiment, the computer system is a computer system/server 512 as shown in FIG. 5, that executes a measuring quality attributes of a virus sample script or computer software application that carries out the operations of at least method 200. In an embodiment, the computer system is a processing unit 516 as shown in FIG. 5, that executes a measuring quality attributes of a virus sample script or computer software application that carries out the operations of at least method 200. In an embodiment, the computer system is a machine learning computer software/program/algorithm that executes a measuring quality attributes of a virus sample script or computer software application that carries out the operations of at least method 200.

In an embodiment, the computer system is a computer system 500 as shown in FIG. 5, that executes a measuring quality attributes of a virus sample script or computer software application that carries out at least operations 210, 212, 214, and 216. In an embodiment, the computer system is a computer system/server 512 as shown in FIG. 5, that executes a measuring quality attributes of a virus sample script or computer software application that carries out at least operations 210, 212, 214, and 216. In an embodiment, the computer system is a processing unit 516 as shown in FIG. 5, that executes a measuring quality attributes of a virus sample script or computer software application that carries out at least operations 210, 212, 214, and 216.

Calculating Protein Fraction

In an embodiment, the calculating the protein fraction of the sample, $x_{protein}$, includes calculating, by the computer system, the protein fraction of the sample, $x_{protein}$, according to $$x_{protein} = \frac{(dn/dc)_{DNA}}{\left(\frac{R_\theta}{K(dRI)M_{protein}^{(expected)}}\right) + (dn/dc)_{DNA} - (dn/dc)_{protein}},$$

where $R_\theta$ is an excess Rayleigh ratio derived from the light scattering data and dRI is the differential refractive index (dRI) data. In a further embodiment, the calculating the protein fraction of the sample, $x_{protein}$, further includes calculating, by the computer system, the optical constant, K, with respect to a solvent refractive index, no, a wavelength, $\lambda$, of the light scattering detector, and Avogrado's number, $N_A$. In an embodiment, the calculating the optical constant, K, includes calculating, by the computer system, the optical constant, K, according to according to $$K = 4\pi^2 n_0^2 (N_A \lambda^4).$$

Calculating DNA Extinction Coefficient

In an embodiment, the calculating the DNA extinction coefficient of the sample, $\varepsilon_{DNA}$, includes calculating the DNA extinction coefficient of the sample, $\varepsilon_{DNA}$, according to $$\varepsilon_{DNA} = \frac{\left(\frac{A}{(dRI)L}\right)[x_{protein}(dn/dc)_{protein} + (1 - x_{protein})(dn/dc)_{DNA}] - x_{protein}\varepsilon_{protein}}{(1 - x_{protein})}.$$

Calculating Quality Attribute Values

In an embodiment, the calculating the quality attribute values of the sample includes calculating, by the computer system, full capsid to total capsid ratio values, $V_g/C_p$, of the sample with respect to the calculated DNA extinction coefficient, $\varepsilon_{DNA}$. In an embodiment, the calculating the quality attribute values of the sample includes calculating, by the computer system, particle concentration values, $C_p$, of the sample with respect to the calculated DNA extinction coefficient, $\varepsilon_{DNA}$. In an embodiment, the calculating the quality attribute values of the sample includes calculating, by the computer system, molar mass values, M, of the sample with respect to the calculated DNA extinction coefficient, $\varepsilon_{DNA}$.

Example

Figure 3A:
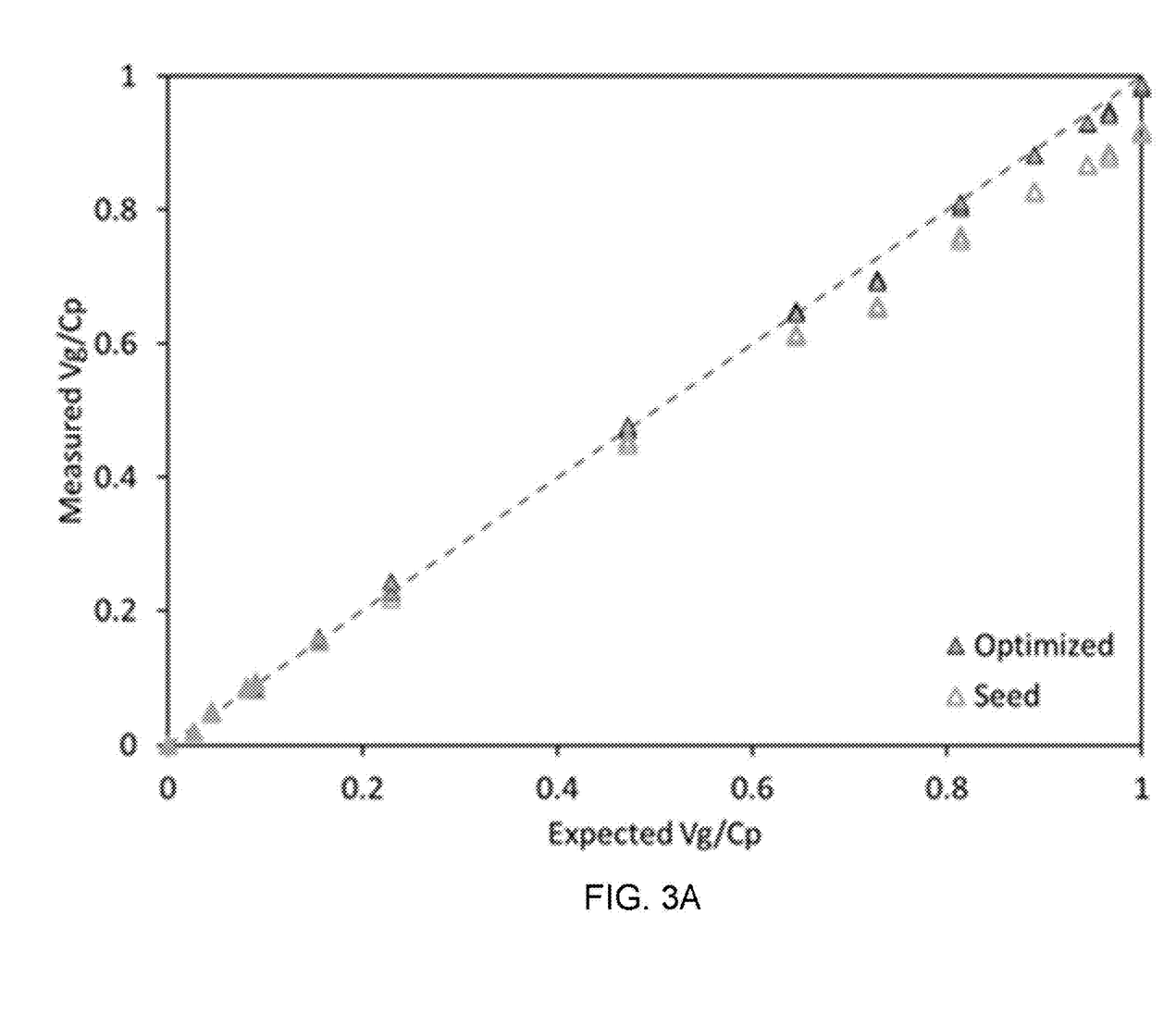
FIG. 3A depicts a graph in accordance with an embodiment.
Figure 3B:
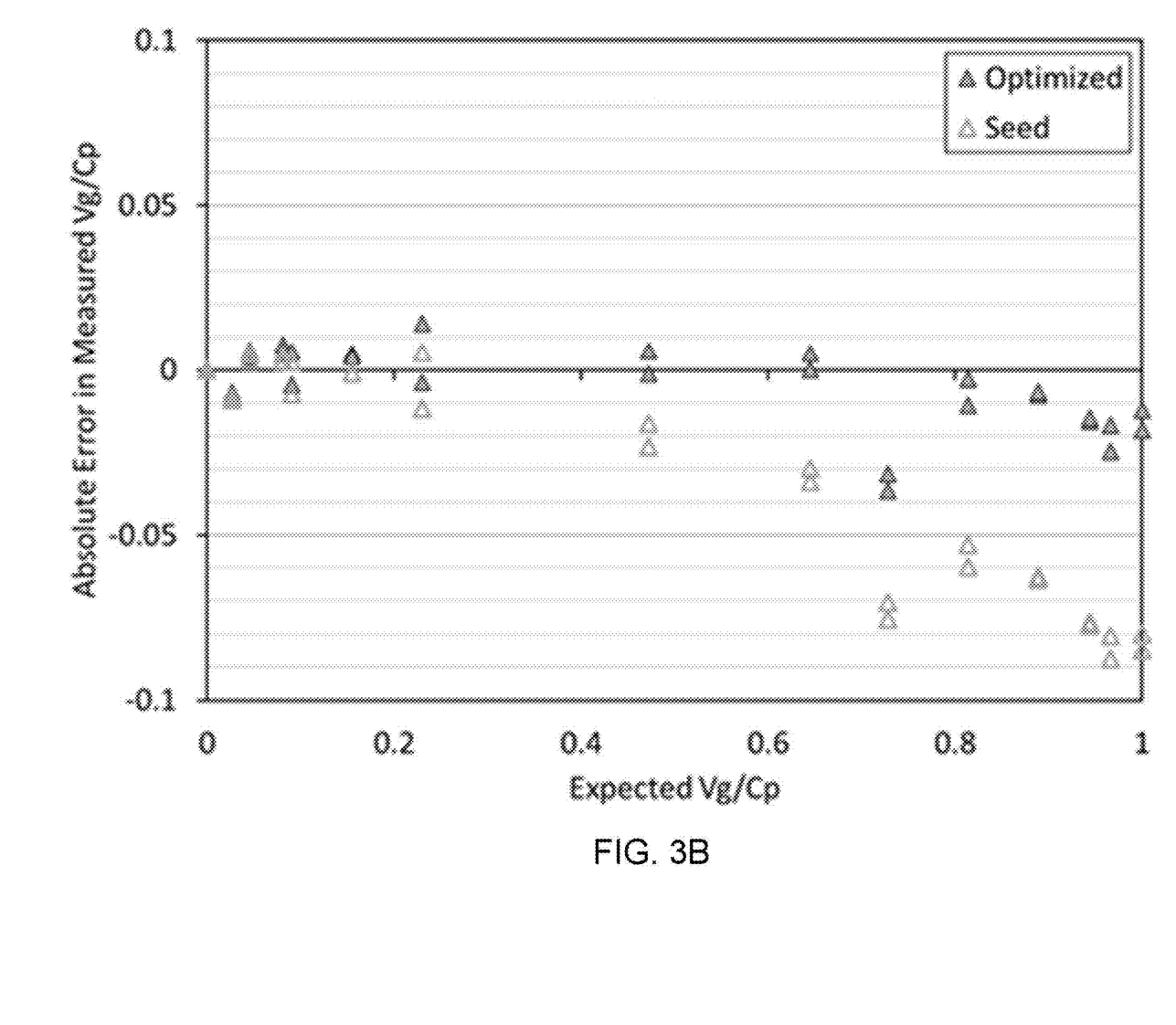
FIG. 3B depicts a graph in accordance with an embodiment.

In an embodiment, FIG. 3A and FIG. 3B depict how well the method, system, and computer product could measure the quality attribute of full capsid to total capsid ratio values, $V_g/C_p$, of the sample. Notably, FIG. 3A depicts a high correlation among measured $V_g/C_p$ values and expected $V_g/C_p$ values. FIG. 3A, FIG. 3B and Table 1 present an example of a series of AAV samples for which optimized extinction coefficients encapsulated DNA were collected using the method, system, and computer product, at 260 nm, at 280 nm, or at both 260 nm and 280 nm if UV data at both wavelengths.

The AAV samples were prepared by mixing together known amounts of "full" and "empty" AAV of the same serotype. Mixtures ranged from 3% full (Vg/Cp=0.03) to 97% full (Vg/Cp=0.97), and data for 100% empty and 100% full were also collected. Each sample was analyzed in duplicate. For each measurement, the particle concentration, molar mass values, and full-to-total ratio (Vg/Cp) were calculated by using (i) non-optimized "seed values" and (ii) optimized coefficients obtained according to the method, system, and computer product. The input parameters are summarized in Table 1.

TABLE 1

| | $\varepsilon_{280}$ ((mg/ml)$^{-1}$ cm$^{-1}$) | | $\varepsilon_{260}$ ((mg/ml)$^{-1}$ cm$^{-1}$) | | Exp. Molar Mass (MDa) | |
|---|---|---|---|---|---|---|
| | Protein | DNA | Protein | DNA | Protein | DNA |
| Seed values | 2.182 | 15 | 1.750 | 25 | 3.77 | 1.16 |
| Optimized values | 2.182 | 14.946 | 1.750 | 24.624 | 3.77 | 1.16 |
| Difference | −0.4% | | −1.5% | | | |

Although the optimized coefficients do not differ by a large degree from the seed values, their impact on the measured Vg/Cp is significant. FIG. 3A shows the measured Vg/Cp using the optimized extinction coefficients, as compared to the seed values. In mixtures with a low percentage of full AAV (low Vg/Cp), there is minimal impact of the improved extinction coefficients, while at higher Vg/Cp, typical of purified samples, the difference becomes remarkable, as shown in FIG. 3A and FIG. 3B.

With the non-optimized extinction coefficients, the error in Vg/Cp becomes progressively worse with increasing Vg/Cp, as shown in FIG. 3B. As shown in FIG. 3B, in the worst case, with the non-optimized coefficients, a sample known to be 97% full is measured as being only 88% full, while the error in Vg/Cp using optimized coefficients is within 0.04, with the majority of the data falling within ±0.02 of the actual value.

Figure 4:
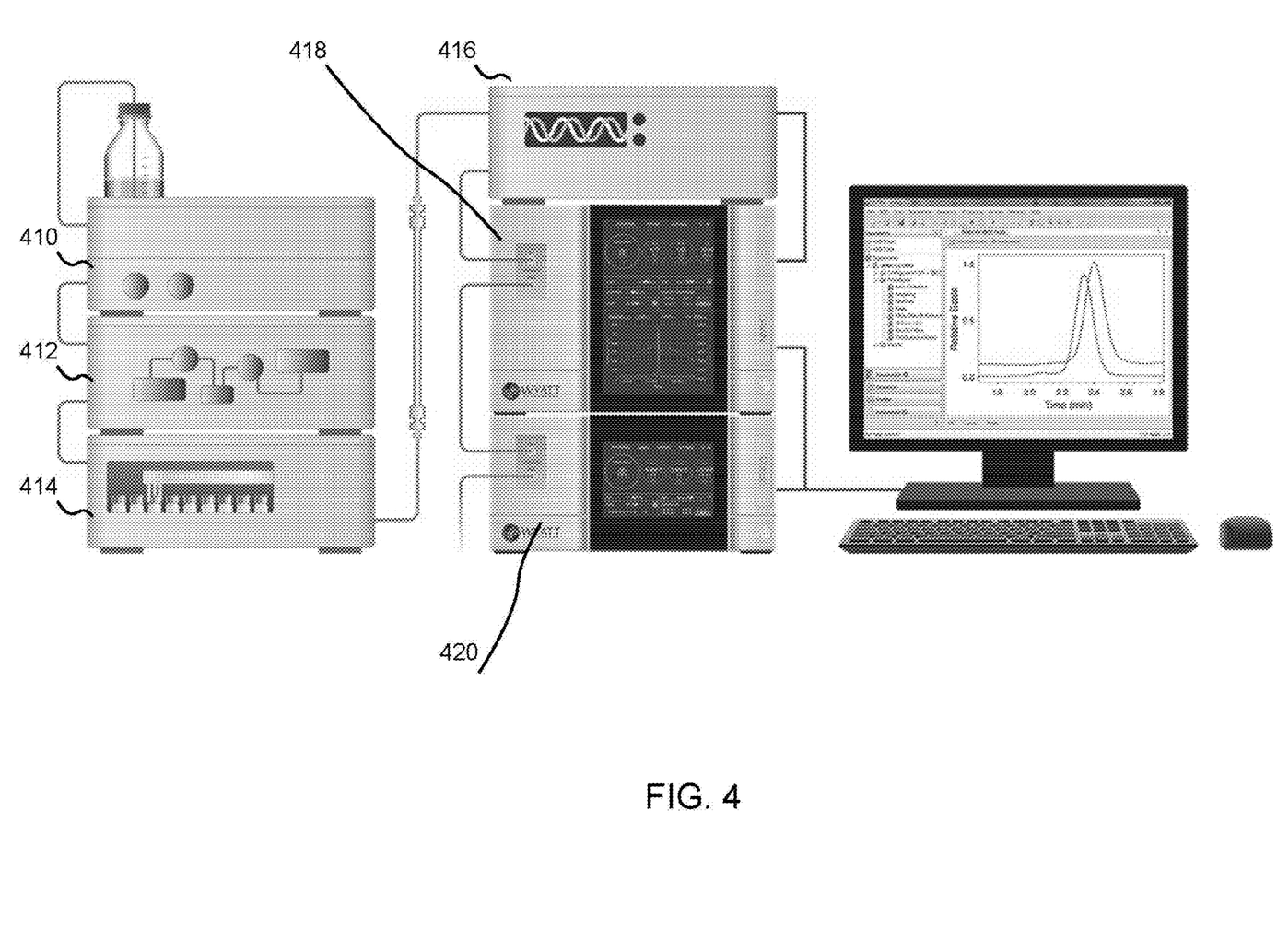
FIG. 4 depicts instruments in accordance with an embodiment.

In an embodiment, FIG. 4 depicts a typical hardware/instrument configuration of the method, system, and computer product. For example, the typical hardware/instrument configuration could include a degasser 410, a pump 412, an autosampler 414, a UV detector 416, a SLS instrument 418, and dRI detectors 420.

Computer System

In an exemplary embodiment, the computer system is a computer system 500 as shown in FIG. 5. Computer system 500 is only one example of a computer system and is not intended to suggest any limitation as to the scope of use or functionality of embodiments of the present invention. Regardless, computer system 500 is capable of being implemented to perform and/or performing any of the functionality/operations of the present invention.

Computer system 500 includes a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer system/server 512 may be described in the general context of computer system-executable instructions, such as program modules, being executed by a computer system. Generally, program modules may include routines, programs, objects, components, logic, and/or data structures that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 512 in computer system 500 is shown in the form of a general-purpose computing device. The components of computer system/server 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 512 typically includes a variety of computer system readable media. Such media may be any available media that is accessible by computer system/server 512, and includes both volatile and non-volatile media, removable and non-removable media.

System memory 528 can include computer system readable media in the form of volatile memory, such as random access memory (RAM) 530 and/or cache memory 532. Computer system/server 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions/operations of embodiments of the invention.

Program/utility 540, having a set (at least one) of program modules 542, may be stored in memory 528 by way of example, and not limitation. Exemplary program modules 542 may include an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the present invention.

Computer system/server 512 may also communicate with one or more external devices 514 such as a keyboard, a pointing device, a display 524, one or more devices that enable a user to interact with computer system/server 512, and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems.

Computer Program Product

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer implemented method for measuring quality attributes of a sample, comprising:
    characterizing, by a light scattering detector, the sample;
    measuring, by a differential refractometer, a refractive index of the sample;
    generating, by an ultraviolet (UV) detector, absorbance data, A, of the sample;
    receiving, by a computer system, light scattering data corresponding to the characterizing of the sample from the light scattering detector that characterizes differential refractive index data corresponding to the measured refractive index from the differential refractometer, and the absorbance data, A, from the UV detector having at least one wavelength;
    receiving, by the computer system, a molecular weight of a protein component of the sample, $M_{protein\ (expected)}$, a refractive index increment of the protein component, $(dn/dc)_{protein}$, a refractive index increment of a DNA component of the sample, $(dn/dc)_{DNA}$, and an extinction coefficient of the protein component, $\varepsilon_{protein}$, at the at least one wavelength from a data source;
    calculating, by the computer system, a protein fraction of the sample, $x_{protein}$, from the light scattering data, the differential refractive index data, the molecular weight of the protein component, $M_{protein\ (expected)}$, the refractive index increment of the protein component, $(dn/dc)_{protein}$, the refractive index increment of the DNA component, $(dn/dc)_{DNA}$, and an optical constant, K;
    calculating, by the computer system, a DNA extinction coefficient of the sample, $\varepsilon_{DNA}$, at the at least one wavelength from the calculated protein fraction, $x_{protein}$, the differential refractive index data, the ultraviolet absorbance data, A, the refractive index increment of the protein component, $(dn/dc)_{protein}$, the refractive index increment of the DNA component, $(dn/dc)_{DNA}$, the extinction coefficient of the protein component, $\varepsilon_{protein}$, at the at least one wavelength, and a path length, L, of a cell in the UV detector; and
    calculating, by the computer system, quality attribute values of the sample with respect to the calculated DNA extinction coefficient, $\varepsilon_{DNA}$.

2. The method of claim 1 wherein the light scattering data comprises static light scattering (SLS) data.

3. The method of claim 2 wherein the light scattering data further comprises dynamic light scattering (DLS) data.

4. The method of claim 1 wherein the sample comprises a virus with a radius of less than 30 nm.

5. The method of claim 4 wherein the sample comprises adeno-associated virus (AAV).

6. The method of claim 1 wherein the at least one wavelength is 260 nm.

7. The method of claim 1 wherein the at least one wavelength is 280 nm.

8. The method of claim 1 wherein the calculating the protein fraction of the sample, $x_{protein}$, further comprises
    calculating, by the computer system, the optical constant, K, with respect to a solvent refractive index, no, a wavelength, $\lambda$, of the light scattering detector, and Avogrado's number, $N_A$.

9. The method of claim 1 wherein the calculating the quality attribute values of the sample comprises
    calculating, by the computer system, full capsid to total capsid ratio values, $V_g/C_p$, of the sample with respect to the calculated DNA extinction coefficient, $\varepsilon_{DNA}$.

10. The method of claim 1 wherein the calculating the quality attribute values of the sample comprises
    calculating, by the computer system, particle concentration values, $C_p$, of the sample with respect to the calculated DNA extinction coefficient, $\varepsilon_{DNA}$.

11. The method of claim 1 wherein the calculating the quality attribute values of the sample comprises
    calculating, by the computer system, molar mass values, M, of the sample with respect to the calculated DNA extinction coefficient, $\varepsilon_{DNA}$.

12. A computer implemented method for measuring quality attributes of a sample, comprising:
    receiving, by a computer system, light scattering data from a light scattering detector that analyzes separations of a virus sample, differential refractive index data corresponding to a refractive index of the virus sample measured from a differential refractometer, and further receiving ultraviolet (UV) absorbance data, A, generated from a UV detector at at least one wavelength;
    receiving, by the computer system, a molecular weight of a protein component of the sample, $M_{protein\ (expected)}$, a refractive index increment of the protein component, $(dn/dc)_{protein}$, a refractive index increment of a DNA component of the sample, $(dn/dc)_{DNA}$, an extinction coefficient of the protein component, $\varepsilon_{protein}$, at the at least one wavelength, and a protein fraction of the sample, $x_{protein}$, from a data source;
    calculating, by the computer system, a DNA extinction coefficient of the sample, $\varepsilon_{DNA}$, at the at least one wavelength from the protein fraction, $x_{protein}$, the differential refractive index data, the ultraviolet absorbance data, A, the refractive index increment of the protein component, $(dn/dc)_{protein}$, the refractive index increment of the DNA component, $(dn/dc)_{DNA}$, the extinction coefficient of the protein component, $\varepsilon_{protein}$, at the at least one wavelength, and a path length, L, of a cell in the UV detector; and calculating, by the computer system, quality attribute values of the sample with respect to the calculated DNA extinction coefficient, $\varepsilon_{DNA}$.

13. The method of claim 12 further comprising calculating, by the computer system, the protein fraction of the sample, $x_{protein}$, with respect to the light scattering data, the differential refractive index data, the molecular weight of the protein component, $M_{protein\ (expected)}$, the refractive index increment of the protein component, $(dn/dc)_{protein}$, the refractive index increment of the DNA component, $(dn/dc)_{DNA}$, and an optical constant, K.

14. The method of claim 13 wherein the calculating the protein fraction of the sample, $x_{protein}$, further comprises calculating, by the computer system, the optical constant, K, with respect to a solvent refractive index, $n_0$, a wavelength, $\lambda$, of the light scattering detector, and Avogrado's number, $N_A$.

15. The method of claim 12 wherein the calculating the quality attribute values of the sample comprises calculating, by the computer system, full capsid to total capsid ratio values, $V_g/C_p$, of the sample with respect to the calculated DNA extinction coefficient, $\varepsilon_{DNA}$.

16. The method of claim 12 wherein the calculating the quality attribute values of the sample comprises calculating, by the computer system, particle concentration values, $C_p$, of the sample with respect to the calculated DNA extinction coefficient, $\varepsilon_{DNA}$.

17. The method of claim 12 wherein the calculating the quality attribute values of the sample comprises calculating, by the computer system, molar mass values, M, of the sample with respect to the calculated DNA extinction coefficient, $\varepsilon_{DNA}$.

18. A system comprising:

a memory; and a processor in communication with the memory, the processor configured to perform a method comprising receiving, by a computer system, light scattering data from a light scattering detector that analyzes separations of a virus sample, differential refractive index data corresponding to a refractive index of the virus sample measured from a differential refractometer, and further receiving ultraviolet (UV) absorbance data, A, generated from a UV detector at at least one wavelength;

receiving a molecular weight of a protein component of the sample, $M_{protein\ (expected)}$, a refractive index increment of the protein component, $(dn/dc)_{protein}$, a refractive index increment of a DNA component of the sample, $(dn/dc)_{DNA}$, and an extinction coefficient of the protein component, $\varepsilon_{protein}$, at the at least one wavelength from a data source;

calculating a protein fraction of the sample, $x_{protein}$, with respect to the light scattering data, the differential refractive index data, the molecular weight of the protein component, $M_{protein\ (expected)}$, the refractive index increment of the protein component, $(dn/dc)_{protein}$, the refractive index increment of the DNA component, $(dn/dc)_{DNA}$, and an optical constant, K;

calculating a DNA extinction coefficient of the sample, $\varepsilon_{DNA}$, at the at least one wavelength from the calculated protein fraction, $x_{protein}$, the differential refractive index data, the ultraviolet absorbance data, A, the refractive index increment of the protein component, $(dn/dc)_{protein}$, the refractive index increment of the DNA component, $(dn/dc)_{DNA}$, the extinction coefficient of the protein component, $\varepsilon_{protein}$, at the at least one wavelength, and a path length, L, of a cell in the UV detector; and calculating quality attribute values of the sample with respect to the calculated DNA extinction coefficient, $\varepsilon_{DNA}$.

19. A computer program product comprising a non-transitory computer readable storage medium having program instructions embodied therewith, the program instructions executable by a processor to cause the processor to perform a method comprising:

receiving light scattering data from a light scattering detector that analyzes separations of a virus sample, differential refractive index data corresponding to a refractive index of the virus sample measured from a differential refractometer, and further receiving ultraviolet (UV) absorbance data, A, generated from a UV detector at at least one wavelength;

receiving a molecular weight of a protein component of the sample, $M_{protein\ (expected)}$, a refractive index increment of the protein component, $(dn/dc)_{protein}$, a refractive index increment of a DNA component of the sample, $(dn/dc)_{DNA}$, and an extinction coefficient of the protein component, $\varepsilon_{protein}$, at the at least one wavelength from a data source;

calculating a protein fraction of the sample, $x_{protein}$, from the light scattering data, the differential refractive index data, the molecular weight of the protein component, $M_{protein\ (expected)}$, the refractive index increment of the protein component, $(dn/dc)_{protein}$, the refractive index increment of the DNA component, $(dn/dc)_{DNA}$, and an optical constant, K;

calculating a DNA extinction coefficient of the sample, εDNA, at the at least one wavelength from the calculated protein fraction, $x_{protein}$, the differential refractive index data, the ultraviolet absorbance data, A, the refractive index increment of the protein component, $(dn/dc)_{protein}$, the refractive index increment of the DNA component, $(dn/dc)_{DNA}$, the extinction coefficient of the protein component, $\varepsilon_{protein}$, at the at least one wavelength, and a path length, L, of a cell in the UV detector; and calculating quality attribute values of the sample with respect to the calculated DNA extinction coefficient, $\varepsilon_{DNA}$.

* * * * *